Reissued Mar. 30, 1926.

Re. 16,301

UNITED STATES PATENT OFFICE.

WILLIAM P. BENTLEY, OF DALLAS, TEXAS.

TREATMENT OF ROCK ASPHALT.

No Drawing. Original No. 1,529,829, dated March 17, 1925, Serial No. 643,087, filed June 2, 1923. Application for reissue filed February 11, 1926. Serial No. 87,693.

*To all whom it may concern:*

Be it known that I, WILLIAM P. BENTLEY, a citizen of the United States, residing in the city of Dallas, county of Dallas, and State of Texas, have invented certain new and useful Improvements in the Treatment of Rock Asphalt, of which the following is a specification.

This invention relates to improvements in a method of treating rock asphalt, and refers more particularly to a process or method of treating native rock asphalt such as that mined in the Southern States comprising a mineral such as rock of calcareous of siliceous origin containing a bitumen interspersed in the voids and pores of the rock.

Among the objects of the invention are to provide a composition having waterproof properties and susceptible of being worked and applied to surfaces for the purpose of insulating or waterproofing while cold.

Other objects of the invention lie in the application of the substance as a roofing or flooring purpose, covering for acid containers or reservoirs, water tanks, its most useful purpose however, being for paving purposes, its characteristics being such as to be admirably adapted for road coverings, sidewalks and other types of paving.

A further advantage of the process lies in the fact that the material can be laid in thin wearing surfaces that are stable, and do not creep and disintegrate even under heavy traffic. Surfacing from one-half to one and one-half inches in thickness laid cold does not wave or disintegrate, continuing to remain intact until worn out.

The invention has to do with the composition produced by disintegrating the rock and treating the bitumen contained therein to produce a mixture containing mineral rock and an asphaltic and bituminous substance, the latter having certain characteristics which may be varied according to the purpose for which the composition is to be used. The varying of the character of the composition may be effected without the use of heat.

Heretofore, it has been impossible to make cold rock asphalt mixtures using a properly prepared asphaltic, semiasphaltic or paraffin base fluxes, that is, material having a flashpoint in the vicinity of 350° F., or higher. The reason for this is that fluxes from which the light constituents have been removed, will not mix and dissolve the cold hard asphalt that is exposed subsequent to the disintegration or pulverizing of the rock asphalt.

It is essential that a solvent that will operate readily on the cold bitumen in the rock, be present. In order to supply this necessary solvent, a light distillate such as gasoline, kerosene, gas oil, naphtha, solar oil or the like, is added to the pulverized rock asphalt. The quantity of light distillate solvent will vary considerably with the size of the particles in which the rock asphalt has been broken, for the reason that when the rock asphalt has been finely comminuted, a greater surface area must be treated, and more bitumen liquefied. This amount of light solvent needed, is not necessarily an exact amount, for the reason that its function is to liquefy the bituminous or asphaltic substance in the rock, only for a very limited period of time. Under normal conditions, ten to thirty minutes will be sufficient time in which to perform this function, and it may then be evaporated without harm to the composition. Under certain conditions of disintegration, it has been found that one gallon of light distillate to one thousand pounds of rock asphalt is a satisfactory relation.

This amount will necessarily vary also with the varying of the percentage of bituminous or asphaltic material naturally contained in the rock asphalt.

In certain cases, it is necessary to add asphaltic or bituminous material to the rock asphalt to supply thereto the desired percentage of bituminous substance and impart the proper consistency. Should the asphalt in the rock be of high enough percentage, and of the proper penetration for the purposes for which it is to be used, the composition which has been treated with the distillate may be compressed into final form immediately by rolling or tamping, and the process is complete. In the event that the asphalt in the rock be too hard for the purposes for which the composition is to be used, as in the bituminous limestones of Texas and Alabama, whose use is limited practically to paving purposes, or should it be necessary to add asphalt to increase the percentage of bituminous matter in the mixture, then the pulverized rock asphalt after the addition of a solvent, has supplied thereto an asphaltic flux to increase the asphaltic content. That is, after adding the light distillate which tends to dissolve and soften the bituminous material in the pulverized rock, a flux or asphalt having the characteristics necessary to bring the rock asphalt to the desired consistency and proper asphaltic percentage, is added.

For example, Uvalde rock asphalt pulverized in any type of approved mechanical mixer, either of the pug mill type or a revolving concrete mixer type, may be treated with from two-thirds to one and one-thirds gallon distillate per one thousand pounds of the pulverized rock asphalt. After thoroughly mixing the distillate and rock asphalt, there is incorporated thereto, the desired asphalt, semi-asphaltic or paraffin base flux in a like manner to that in which the solvent was added, either by spraying into the cylinder type of mixer, or by pouring or spraying into the pug mill. It has been found that pouring the flux into the pug mill mixer is as effective as spraying, and furthermore, if spraying is used, gravity feed is sufficient.

The fluxes prior to being added to the pulverized rock asphalt are preferably heated to temperatures in the neighborhood of 200° F., or more, depending upon their viscosities in order that they may be in a thoroughly liquefied condition. The paraffin base flux known in Texas as Magnolia Uvalde rock asphalt flux has substantially the following specifications: A gravity ranging from 19 to 21° Baumé, a flashpoint in excess of or not less than 350° F., evaporation not over 5% when heated continuously for seven hours at 325° F. In utilizing this type of oil and heating it to temperatures in excess of 200° F., an excellent combination of the flux with the rock asphalt bitumen is obtained, if the pulverized rock asphalt has been previously treated with small quantity of light distillate. When using fluxes which are solid at ordinary temperatures, they should be heated sufficiently to convert them into a relatively fluid condition.

The result of combining a flux in this manner by first softening the bituminous material in the rock, with a solvent, is to cause the flux to intimately commingle and permanently unite with the bitumen in the rock due to the fact that this bitumen has been rendered temporarily liquid by the distillate solvent. Without the use of a solvent of this character, it is impossible to make a satisfactory union of the heated fluxes with the cold bitumen in the cold rock asphalt, that is, it is necessary to heat the asphalt containing rock sufficiently to liquefy the asphalt contained therein, and permit the unity of the asphalt and fluxes while the two materials are in a liquid condition.

It is clear that the function of the distillate is merely temporary, but enables the rock asphalt to be properly fluxed in a cold state, whereas, it would otherwise be necessary to heat the rock in order to effect a proper union.

Heretofore, it has been the common practice to add an unrefined oil to the rock asphalt and produce a softening of the asphaltic substance while the asphalt is in a cold and pulverized condition. Such oils however, vary greatly in gravity, viscosity, asphaltic content, and volatile constituents, and normally have a certain amount of objectionable water contained therein. These factors being variable, naturally produce varying results which are objectionable in the production of uniform products or composition. It is also a fact that where the rock asphalt contains enough bitumen for paving purposes, but where this bitumen is of too hard a consistency as in Uvalde rock asphalt, the use of an unrefined asphalt oil, regardless of the resulting consistency, must be restricted to an amount to prevent an excess of bitumen in the final product.

In the process explained, the amount of flux added to the pulverized asphaltic substance may be identical to that used in hot processes. Therefore, the bitumen content may be accurately regulated and the consistency of the bitumen carefully controlled.

A further advantage of the addition of the fluxes to the cold rock asphalt is that the consistency of the bitumen can be made the same as in the hot asphalt processes, or even higher with an equal quantity of flux, owing to the fact that there is no hardening due to the heating process.

For Alabama rock asphalt, which contains approximately 7% bitumen, a satisfactory treatment would be about one gallon of distillate per one thousand pounds of rock asphalt and flux while the rock asphalt is cold, the flux consisting of an asphalt which is solid at ordinary temperatures and which has been liquefied by heating.

A further advantage of the process is the fact that cold mixed pavements will be in all respects very similar and as uniform as the pavements that are made by methods of heating the rock asphalt. Treating cold in this manner eliminates the objectionable features accompanying the heating of the rock asphalts by a fuel oil blast directed on the inside or to the exterior of the cylinder in which the rock asphalt is contained. The working temperature inside of the cylinders frequently runs as high as 1800° F., resulting in a loss of valuable properties in the native bitumen and rock asphalt, factors which are totally eliminated by the use of a distillate solvent and the addition of a flux as explained.

A proper flux is a residuum conforming to specifications as to gravity, asphalt content, high flash and low evaporation.

In place of adding the distillate and flux separately, it may be desirable to add the distillate to the flux and incorporating the combination to the cold pulverized rock asphalt in a similar manner to that explained in connection with the adding of the distillate or flux previously.

Following are samples made of characteristic combinations, which give satisfactory results for paving. It is understood, however, that these are particularly given as examples, and in no way tend to limit the scope of the invention, as innumerable satisfactory combinations may be utilized for the different uses to which the composition may be applied.

| Pulverized rock asphalt | Kind and quantity distillate | Gals. flux |
|---|---|---|
| 3000 lbs | Coal oil 2 gal | 4 |
| 3000 lbs | Coal oil 4 gal | 6 |
| 3000 lbs | Gasoline 4 gal | 4 |
| 3000 lbs | Gasoline 2 gal | 5 |
| 3000 lbs | Gasoline 4 gal | 6 |

The salient elements of the invention consist in pulverizing or breaking up the mineral rock asphalt, and while in a broken up state adding a liquid solvent thereto to soften the bituminous or asphaltic substance contained in the rock, and incorporating with the pulverized or broken up material a flux to supply thereto certain desirable characteristics such as increasing or decreasing the consistency and hardness of the bituminous or asphaltic substance contained therein, and increasing to the amount desired, the percentage of bituminous material present. The preparation of the material for laying is done while the rock asphalt is in a cold state.

A further advantage of the process arises from the fact that very much simpler and inexpensive equipment may be utilized than that required for the hot process.

Batches can be made up at any time to be used in the future, thus permitting the transporting of the material from place to place and eliminating the necessity of heating and reheating whenever it is to be used.

Having thus described my invention, what I claim is:

1. A process for making a bituminous composition, consisting in mixing less than 5% by weight of an atmospherically volatile liquefier with disintegrated bitumen-containing rock, and separately adding to this mixture less than 10% by weight of a normally adhesive viscous flux and controlling the penetration and bituminous content of the final product by regulating the viscosity and amount of flux.

2. A process for making a road composition, consisting in pulverizing unheated bitumen-containing rock, mixing therewith less than 5% of an atmospherically volatile liquefier, and separately adding to this mixture a normally adhesive flux, causing said flux to permanently unite with the naturally contained bituminous material, and controlling the bituminous content in the final product by regulating the amount of flux.

3. A process for making a road composition consisting in pulverizing unheated bitumen-containing rock, mixing therewith less than 5% of an atmospherically volatile liquefier, and separately adding to this mixture less than 10% of a normally adhesive viscous flux, and accurately regulating the penetration of the bitumen in the final composition by controlling the viscosity of the flux.

4. A process for making a road composition consisting in pulverizing unheated bitumen-containing rock, mixing therewith an atmospherically volatile liquefier, and separately adding to this mixture liquid viscous flux in heated condition and controlling the percentage of bituminous material and consistency of bitumen in the final composition, by regulating the quantity and viscosity of the flux.

5. A process for making a road composition, comprising mixing pulverized bitumen-containing rock with an atmospherically volatile liquefier and a normally adhesive flux, causing said flux to permanently unite with the naturally contained bituminous material, and controlling the bituminous content in the final product by regulating the amount and character of flux added.

6. A process for making a road composition, comprising mixing pulverized bitumen-containing rock with an atmospherically volatile liquefier and a normally adhesive flux, causing said flux to permanently unite with the naturally contained bituminous material, and accurately regulating the penetration of the bitumen in the final composition by controlling the viscosity of the added flux.

7. A process for making a road composition, comprising mixing pulverized bitumen-containing rock with an atmospherically volatile liquefier and a normally adhesive flux, causing said flux to permanently unite with the naturally contained bituminous material, and controlling the percentage of bituminous material and consistency of bitumen in the final composition by regulating the quantity and viscosity of flux added.

WILLIAM P. BENTLEY.